United States Patent
Pai et al.

(10) Patent No.: US 9,686,656 B2
(45) Date of Patent: Jun. 20, 2017

(54) METHOD AND APPARATUS FOR CONTROLLING GROUP AFFILIATION FOR A USER WITH MULTIPLE MOBILE DEVICES

(71) Applicant: MOTOROLA SOLUTIONS, INC, Schaumburg, IL (US)

(72) Inventors: Madhusudan K. Pai, Schaumburg, IL (US); Ilya Freytsis, Swampscott, MA (US); Scott J. Pappas, Lake Zurich, IL (US); Thomas J. Senese, Schaumburg, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/810,628

(22) Filed: Jul. 28, 2015

(65) Prior Publication Data

US 2017/0034672 A1  Feb. 2, 2017

(51) Int. Cl.
*H04W 4/08* (2009.01)
*H04W 8/02* (2009.01)
*H04W 8/18* (2009.01)

(52) U.S. Cl.
CPC ............. *H04W 4/08* (2013.01); *H04W 8/02* (2013.01); *H04W 8/186* (2013.01)

(58) Field of Classification Search
CPC ....... H04W 4/08; H04W 4/10; H04W 76/005; H04W 84/08; H04W 8/186; H04W 76/025; H04L 65/4061; H04L 29/06442
USPC .................................................. 455/518–520
See application file for complete search history.

(56) References Cited

U.S. PATENT DOCUMENTS

| | | |
|---|---|---|
| 9,510,166 B1 | 11/2016 | Allen et al. |
| 2013/0109426 A1* | 5/2013 | Kerger .................... H04W 4/10 455/518 |
| 2014/0243034 A1 | 8/2014 | Gurney et al. |

FOREIGN PATENT DOCUMENTS

| | | |
|---|---|---|
| EP | 1240594 B1 | 4/2004 |
| WO | 2013032735 A1 | 3/2013 |
| WO | 2015077069 A1 | 5/2015 |

OTHER PUBLICATIONS

Intellectual Property Office, Patents Act 1977: Combined Search and Examination Report under Sections 17 and 18(3), for Application No. GB1612624.5, mailed: Dec. 8, 2016, all pages.

* cited by examiner

*Primary Examiner* — Philip Sobutka (57) ABSTRACT

A communication system is provided for controlling group affiliation in a wireless communication system, wherein a group management server determines, or modifies, a set of one or more group affiliation parameters and group de-affiliation parameters associated with a mobile device based on capabilities of another mobile device and/or a set of one or more group affiliation parameters and group de-affiliation parameters associated with the another mobile device. The mobile devices may be mobile devices of a same user or may be mobile devices of different users. In other embodiments of the present invention, in response to receiving a request to initiate a group call involving a group that includes multiple mobile devices of a same user, the group management server may select only one of the multiple mobile devices to participate in the group call and arrange for only the selected mobile device to participate in the group call.

19 Claims, 5 Drawing Sheets

FIG. 5

METHOD AND APPARATUS FOR CONTROLLING GROUP AFFILIATION FOR A USER WITH MULTIPLE MOBILE DEVICES

FIELD OF THE INVENTION

The present invention relates generally to wireless communication systems and, in particular, to group affiliation in association with provisioning group services in a wireless communication system.

BACKGROUND OF THE INVENTION

Today, talkgroup affiliation is triggered by an end user device affiliating to the talkgroup based on a pre-configuration of the talkgroups or based on a user-defined talkgroup scanning list (for example, in Land Mobile Radio (LMR) talkgroups communications). Motorola Push-to-Talk (MPTT) supports an implicit affiliation of a client device to all talkgroups on a talkgroup list when the client registers with a Push-to-Talk (PTT) server. MPTT also supports the client device informing the PTT server of the client device's scan list. When a user is using multiple client devices, there is the possibility that the user may receive multiple audio streams via the multiple client devices as part of a same talkgroup session, which wastes system bandwidth and air interface resources and can result in confusion for the user. Further, when a user of a shared (among multiple users) mobile device, such as a police radio, leaves the shared mobile device "on" at the end of the user's shift, the shared mobile device remains affiliated to the user's talkgroups even after the shift ends, thereby consuming resources in the user's base site (for example, Multicast-Broadcast Single-Frequency Network (MBSFN) resources).

Therefore, there is a need to provide an automated set of affiliation/de-affiliation procedures for PTT mobile devices.

BRIEF DESCRIPTION OF SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

A method and apparatus are provided for controlling group affiliation in a wireless communication system. The wireless communication system includes a group management server, which group management server determines, or modifies, a set of one or more group affiliation parameters and group de-affiliation parameters associated with a mobile device based on capabilities of another mobile device and/or a set of one or more group affiliation parameters and group de-affiliation parameters associated with the another mobile device. In various embodiments of the present invention, the mobile devices may be mobile devices associated with a same user or may be mobile devices associated with different users. In other embodiments of the present invention, in response to receiving a request to initiate a group call involving a group that includes both a first and a second mobile device of a same user, the group management server may select only one of the first and second mobile devices to participate in the group call and arrange for only the selected mobile device to participate in the group call.

Generally, an embodiment of the present invention encompasses a method for controlling group affiliation in a wireless communication system. The method includes receiving, by a group management server from a second mobile device associated with a user, an affiliation request; determining, by the group management server, values for a second set of one or more group affiliation parameters and group de-affiliation parameters for the second mobile device, wherein the second set of one or more group affiliation parameters and group de-affiliation parameters concern affiliation by the second mobile device with a set of groups and wherein the determination of the second set of one or more group affiliation parameters and group de-affiliation parameters is based on one or more of: a capability of a first mobile device associated with the user; and one or more values of a first set of one or more group affiliation parameters and group de-affiliation parameters associated with the first mobile device. The method further includes, in response to receiving the affiliation request, conveying, to the second mobile device, the second set of one or more group affiliation parameters and group de-affiliation parameters.

Another embodiment of the present invention encompasses a method for controlling group affiliation in a wireless communication system. The method includes receiving, by a Group Management Server, a request to initiate a group call involving a group comprising a first mobile device and a second mobile device of a same user; selecting, by the Group Management Server, only one of the first mobile device and the second mobile device to participate in the group call; and arranging, by the Group Management Server, for only the selected mobile device of the first mobile device and the second mobile device to participate in the group call.

Yet another embodiment of the present invention encompasses an apparatus for implementing a group call in a wireless communication system. The apparatus includes a Group Management Server comprising a processor and an at least one memory device that is configured to store a set of instructions that, when executed by the processor, cause the processor to perform the following functions: receive, from a second mobile device associated with a user, an affiliation request; determine for a second set of one or more group affiliation parameters and group de-affiliation parameters for the second mobile device, wherein the second set of one or more group affiliation parameters and group de-affiliation parameters concern affiliation by the second mobile device with a set of groups and wherein the determination of the second set of one or more group affiliation parameters and group de-affiliation parameters is based on one or more of: a capability of a first mobile device associated with the user; and one or more values of a first set of one or more group affiliation parameters and group de-affiliation parameters associated with the first mobile device. Further, the set of instructions, when executed by the processor, cause the processor to, in response to receiving the affiliation request, convey, to the second mobile device, the second set of one or more group affiliation parameters and group de-affiliation parameters.

Still another embodiment of the present invention encompasses an apparatus for for implementing a group call in a wireless communication system. The apparatus includes a Group Management Server comprising a processor and an at least one memory device that is configured to store a set of instructions that, when executed by the processor, cause the processor to perform the following functions: receive a request to initiate a group call involving a group comprising a first mobile device and a second mobile device of a same user; select only one of the first mobile device and the second mobile device to participate in the group call; and arrange for only the selected mobile device of the first mobile device and the second mobile device to participate in the group call.

Yet another embodiment of the present invention encompasses a method for controlling group affiliation in a wireless communication system. The method includes receiving, by a group management server from a first mobile device, a first affiliation request; in response to receiving the first affiliation request, conveying, to the first mobile device, a first set of one or more group affiliation parameters and group de-affiliation parameters. receiving, by a group management server from a second mobile device, a second affiliation request; in response to receiving the second affiliation request, modifying the first set of one or more group affiliation parameters and group de-affiliation parameters to produce a modified first set of one or more group affiliation parameters and group de-affiliation parameters; and conveying, to the first mobile device, the modified first set of one or more group affiliation parameters and group de-affiliation parameters.

Figure 1:
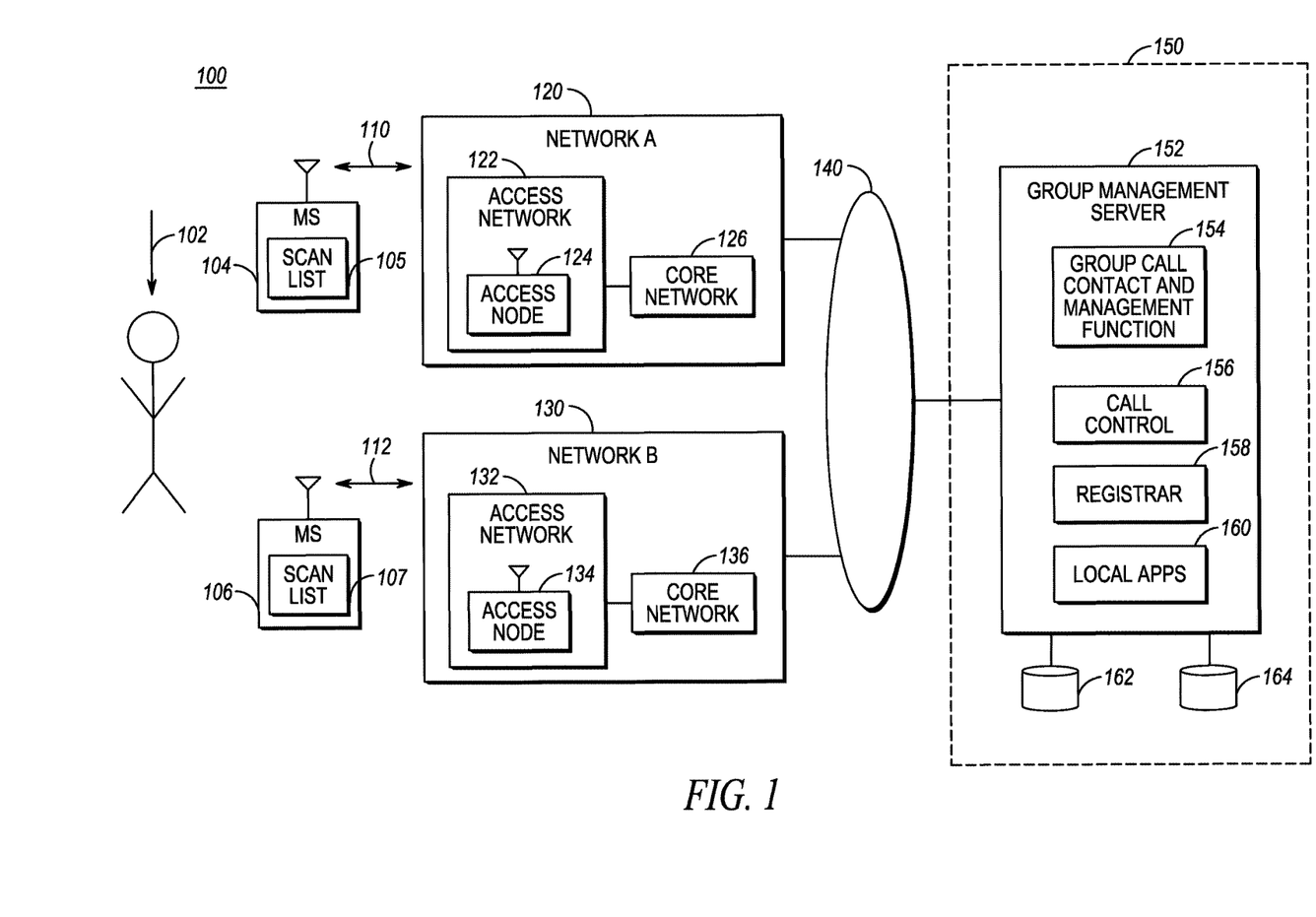
FIG. 1 is a block diagram of a wireless communication system in accordance with various embodiments of the present invention.

The present invention may be more fully described with reference to FIGS. 1-5. FIG. 1 is a block diagram of a wireless communication system 100 in accordance with various embodiments of the present invention. Communication system 100 includes one or more wireless communication networks 120, 130 (two shown), such as a first network 120 and a second network 130. First network 120 comprises a first access network 122 in communication with a first core network 126. First access network 122 includes a first access node 124 that provides wireless communications services to mobile devices residing in a coverage area of the access node via a first air interface 110. Second network 130 comprises a second access network 132 in communication with a second core network 134. Second access network 132 includes a second access node 134 that provides wireless communications services to mobile devices residing in a coverage area of the second access node via a second air interface 112. Each of air interfaces 110 and 112 includes an uplink and a downlink, which uplinks and downlinks each includes multiple traffic channels and multiple signaling channels.

In various embodiments of the present invention, each of the first and second networks 120, 130 may be a same or a different type of network. For example, each of the first and second networks 120, 130 may be a broadband network, each of the first and second networks 120, 130 may be a narrowband network, or one network of the first and second networks 120, 130 may be a broadband network and the other network of the first and second networks 120, 130 may be a narrowband network. For example, one of the multiple networks 120, 130 may be a narrowband network used by a local agency or enterprise, such as a public safety organization, which narrowband network implements a specialized voice communication system that typically supports low-bit-rate digital or analog transmission of audio and/or data streams. An example of such a narrowband network is a network used by a Project 25 (P25)-compatible two-way Push-To-Talk voice communication system that includes wireless and wired voice communication devices. Other examples include a Land Mobile Radio (LMR) network or a Terrestrial Trunked Radio (TETRA) system network. Public safety organizations may choose these narrowband systems because they provide improved end-to-end voice quality and efficient group communication, use advanced cryptography, enable centralized logging of calls, and/or are associated with lower delay and higher reliability. By way of further example, another of the multiple networks 120, 130 may be a broadband network used, in parallel, by the public safety organization to support data applications or may be a commercial carrier broadband network that supports users' personal devices (for example, a 'bring your own device' (BYOD)). An example of such a broadband network is a network that operates in accordance with the Third Generation Partnership Project (3GPP) or 3GPP2 standards or their next generation standards, such as the 3GPP LTE (Long Term Evolution) standard wherein the core network is an evolved packet core (EPC). Broadband networks typically support high-bit-rate digital transmission of data streams, including real-time video.

Communication system 100 further includes multiple mobile devices 104, 106 (two shown) associated with a same user 102 and that each resides within a coverage area, such as a cell or a sector of a cell, of a respective network 120, 130 and that each is provided wireless service by a corresponding access node 124, 134 of their serving networks 120, 130 via the corresponding air interface 110, 112. For example, a first mobile device 104 of the multiple mobile devices 104, 106, may be a narrowband mobile device, for example, a portable narrowband two-way radio, a land mobile radio (LMR), or other similar voice communication entity, and a second mobile device 106 of the multiple mobile devices 104, 106, may be a broadband mobile device, for example, a wireless communication-enabled laptop, tablet, or personal digital assistant (PDA), a cellular telephone, or other similar communication entity. However, in some embodiments of the present invention, each of the multiple mobile devices 104, 106 may be served by a same network, such as one of networks 120 and 130, and may be served by a same access node or by different access nodes of that network. Further, in some embodiments of the present invention, each of the multiple mobile devices 104, 106 may be associated with a different user. Each of the multiple mobile devices 104, 106 maintains a respective scan list 105, 107 that comprises a list of groups of which the mobile device is a member and whose signaling and traffic is monitored by the mobile device when the mobile device is active in communication system 100.

Communication system 100 further includes a local agency or enterprise service network 150 that is remote to core network 126 and 136 and that is accessible by mobile devices 104 and 106 via networks 120 and 130 and a data network 140, such as a private network or the Internet. Service network 150 includes one or more application functions (AFs), such as a Group Management Server 152, for example, a Push-to-Talk (PTT) Server and/or a Site Controller or Zone Controller, that reside above the hierarchical layers of core networks 126 and 136, which in turn reside above the hierarchical layers of access networks 122 and 132. Further, service network 150 includes a group call database 162 and a user profile database 164 that are each accessible by Group Management Server 152. Access nodes 124 and 134, core networks 126 and 136, data network 140, Group Management Server 152, and databases 162 and 164 collectively comprise an infrastructure of communication system 100 and, correspondingly, each may be referred to as an infrastructure element of communication system 100.

Group Management Server 152 includes group call contact and call management functionality 154 that controls group sessions of a communication group, including managing talkgroups and group, or scan, lists (the terms 'group list' and 'scan list' are used interchangeably herein) that are needed for provisioning group services, for example, maintaining identifiers of and contact information for members of a talkgroup. More particularly, group call contact and management functionality 154 provides group list management functionality to communication system 100, for example, creating, modifying, retrieving and deleting communication groups, such as talkgroups, for authorized users, providing storage for talkgroups and lists in a group call database 162 included in, or accessible by, Group Management Server 152, and providing notifications to authorized users of modifications to the communication groups and group lists. Each communication group includes a group identifier (ID), such as a talkgroup ID, that is uniquely associated with the communication group and, in association with the group ID, a list of member identifiers (IDs), such as mobile device IDs, for example, a Subscriber Unit ID (SUID), a Mobile Subscriber ISDN Number (MSISDN) an International Mobile Equipment Identity (IMEI), or an International Mobile Subscriber Identity (IMSI), that uniquely identify each member of the communication group.

Group Management Server 152 further includes call control functionality 156, registrar functionality 158, and one or more applications or services 160, for example, a Push-to-Talk service or a video distribution service. Call control functionality 156 performs call processing and allocates channels/resources for group calls. Registrar functionality 158 authenticates mobile devices, such as mobile devices 104 and 106, when they register in communication system 100, and in particular with Group Management Server 152, and binds a user to a mobile device upon authentication of the mobile device. In other embodiments of the present invention, one or more of call control functionality 156 and registrar functionality 158 may be implemented by an infrastructure element, and in particular an element of service network 150, separate from, and accessible by, Group Management Server 152.

User profile database 164 maintains a user profile for each user, such as user 102, and mobile device, such as mobile devices 104 and 106, registered with communication system 100. For example, user profile database 164 may maintain information concerning services subscribed to by a user, a public safety agency for which the user works, a role and/or rank of the user at the public safety agency, and the capabilities of, and services supported by, each mobile device, such as whether the mobile device is a data-enabled mobile device or is a voice-only mobile device, vocoder capabilities of the mobile device, and whether the mobile device supports multicast/broadcast services such as Multimedia Broadcast/Multicast Services (MBMS) or evolved MBMS (eMBMS) or other LTE multicast services such as SC-PTM (Single Cell Point to Multipoint).

Figure 2:
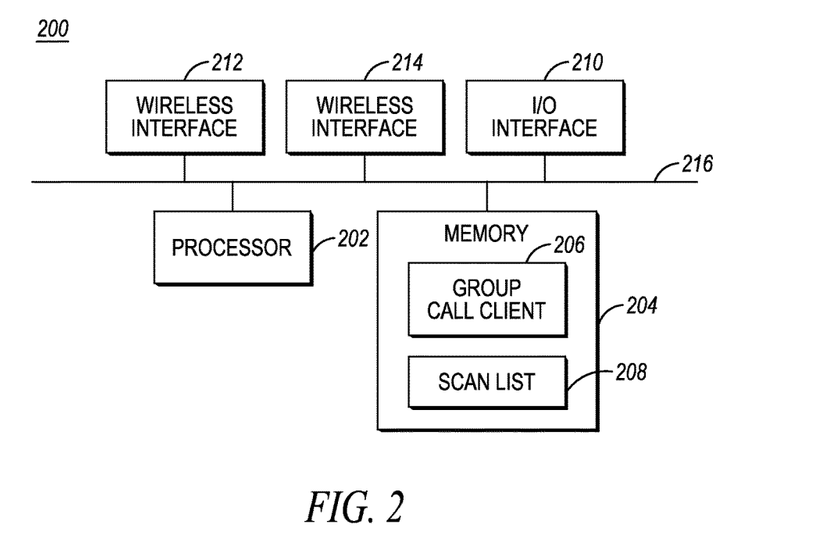
FIG. 2 is a block diagram of a mobile device in accordance with various embodiments of the present invention.

Referring now to FIG. 2, a block diagram of a mobile device 200, such as mobile devices 104 and 106, is provided in accordance with various embodiments of the present invention. Mobile device 200 may be, for example, a smart phone, a land mobile radio (LMR), a vehicle modem, a server mounted in vehicle, a tablet, a laptop, a body-worn computing device, etc. Mobile device 200 generally includes a processor 202, at least one memory device 204, one or more input/output (I/O) interfaces 210, and one or more wireless interfaces 212, 214 (two shown). It should be appreciated by those of ordinary skill in the art that FIG. 2 depicts mobile device 200 in an oversimplified manner, and a practical embodiment may include additional components and suitably configured processing logic to support known or conventional operating features that are not described in detail herein. The components (202, 204, 210, 212, and 214) of mobile device 200 are communicatively coupled via a local interface 216. Local interface 216 can be, for example but not limited to, one or more buses or other wired or wireless connections, as is known in the art. Local interface 216 can have additional elements, which are omitted for simplicity, such as controllers, buffers (caches), drivers, repeaters, and receivers, among many others, to enable communications. Further, local interface 216 may include address, control, and/or data connections to enable appropriate communications among the aforementioned components.

Mobile device 200 operates under the control of processor 202, such as one or more microprocessors, microcontrollers, digital signal processors (DSPs), combinations thereof or such other devices known to those having ordinary skill in the art. Processor 202 operates the corresponding mobile device according to data and instructions stored in the at least one memory device 204, such as random access memory (RAM), dynamic random access memory (DRAM), and/or read only memory (ROM) or equivalents thereof, that stores data and instructions that may be executed by the corresponding processor so that the mobile device may perform the functions described herein.

I/O interfaces 210 may include user interfaces that allow a user to input information in, and receive information from, mobile device 200. For example, the user interfaces may include a keypad, a touch screen, a scroll ball, a scroll bar, buttons, bar code scanner, and the like. Further, the user interfaces may include a display device such as a liquid crystal display (LCD), touch screen, and the like for displaying system output. I/O interfaces 210 also can include, for example, a serial port, a parallel port, a small computer system interface (SCSI), an infrared (IR) interface, a universal serial bus (USB) interface, and the like for communicating with, or coupling to, an external device.

The one or more wireless interfaces 212, 214 (two shown) facilitate an exchange wireless communications with other mobile devices and/or with an access network, such as access networks 122 and 132. For example, the one or more wireless interfaces 212, 214 may include a first, short-range wireless interface 212, such as a Bluetooth apparatus that includes a respective Bluetooth radio and antenna and/or a WLAN apparatus that includes an WLAN transceiver and antenna, for short-range communications with other mobile devices. Further, the one or more wireless interfaces 212, 214 may include a second, longer range wireless interface 214, such as a wireless area network (WAN) radio transceiver with a corresponding antenna.

The data and instructions maintained by at least one memory device 204 include software programs that include an ordered listing of executable instructions for implementing logical functions. For example, the software in at least one memory device 204 includes a suitable operating system (O/S) and programs. The operating system essentially controls the execution of other computer programs, and provides scheduling, input-output control, file and data management, memory management, and communication control and related services. The programs may include various applications, add-ons, etc. configured to provide user functionality with mobile device 200, for example, at least one memory device 204 maintains a group call client 206 that, when executed by processor 202, facilitates a peer-to-peer exchange of signaling and traffic with Group Management Server 152. At least one memory device 204 further maintains at least one identifier (ID) of the mobile device, such as a subscriber unit identifier (SUID), an IMEI, an MSISDN, an IMSI, and/or a SIP URI, that uniquely identifies the mobile device in communication system 100.

Additionally, at least one memory device 204 maintains a scan list 208, such as scan lists 105 and 107, which scan list comprises a list of communication groups, such as talkgroups, of which the mobile device is a member and which groups are monitored by the mobile device for on-going or new group calls. For example, scan list 208 may comprise a list of group IDs that are each uniquely associated with a communication group of which the mobile device is a member. The group IDs may be preprogrammed into at least one memory device 204, may be synchronized to the mobile device and stored in at least one memory device 204 when the mobile device registers with Group Management Server 152 and/or may be input to at least one memory device 204 by a user of the mobile device. Further, as described herein, entries in scan list 208 may be modified by Group Management Server 152 through a use of group affiliation and deaffiliation parameters.

Figure 3:
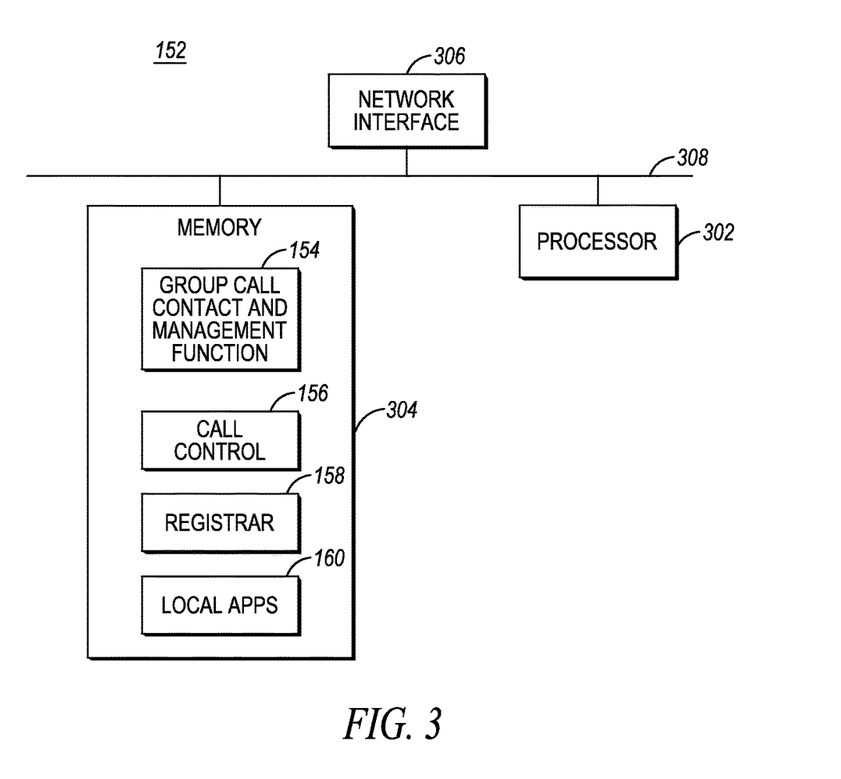
FIG. 3 is a block diagram of a Group Management Server in accordance with an embodiment of the present invention.

Referring now to FIG. 3, a block diagram is provided of Group Management Server 152 in accordance with an embodiment of the present invention. Group Management Server 152 includes a processor 302, such as one or more microprocessors, microcontrollers, digital signal processors (DSPs), combinations thereof or such other devices known to those having ordinary skill in the art. Group Management Server 152 further includes an at least one memory device 304, such as random access memory (RAM), dynamic random access memory (DRAM), and/or read only memory (ROM) or equivalents thereof, that is in communication with a corresponding processor 302, via a corresponding local interface 308, 408. At least one memory device 304 stores data and programs, such as group call programs, that may be executed by processor 302 and that allows the Group Management Server to perform all functions necessary to operate in communication system 100, such as instructions for implementing group call contact and management functionality 154, call control functionality 156, registrar functionality 158, and the one or more applications and services 160.

Group Management Server 152 further includes one or more network interfaces 306 (one shown) that is in communication with processor 302 via a local interface 308 and that provides for interfacing with other infrastructure devices of communication system 100, such as data network 140 and databases 162 and 164. Local interface 308 can be, for example but not limited to, one or more buses or other wired or wireless connections, as is known in the art. Local interface 308 can have additional elements, which are omitted for simplicity, such as controllers, buffers (caches), drivers, repeaters, and receivers, among many others, to enable communications. Further, local interface 308 may include address, control, and/or data connections to enable appropriate communications among the aforementioned components of the Group Management Server.

In order to conserve system bandwidth when a user having multiple activated client (mobile) devices is engaging in a group communication session, and to prevent confusion for the user when each of the multiple activated client devices is playing out the same audio as part of the group communication session, communication system 100 provides for Group Management Server 152 to automatically select which of the multiple client devices will participate in the session, that is, a selected client device, and to prevent the other, non-selected, activated client devices from participating in the session. Thus, system bandwidth is conserved as traffic channels will not be set up for the non-selected client devices and further confusion is minimized for the user as a single client device may be selected to play out audio for the session. Further, in selecting which client device of the multiple client devices will participate in the session, Group Management Server 152 may consider attributes of each client device of the multiple activated client devices, so that an optimal client device may be selected to participate in the session.

Figure 4A:
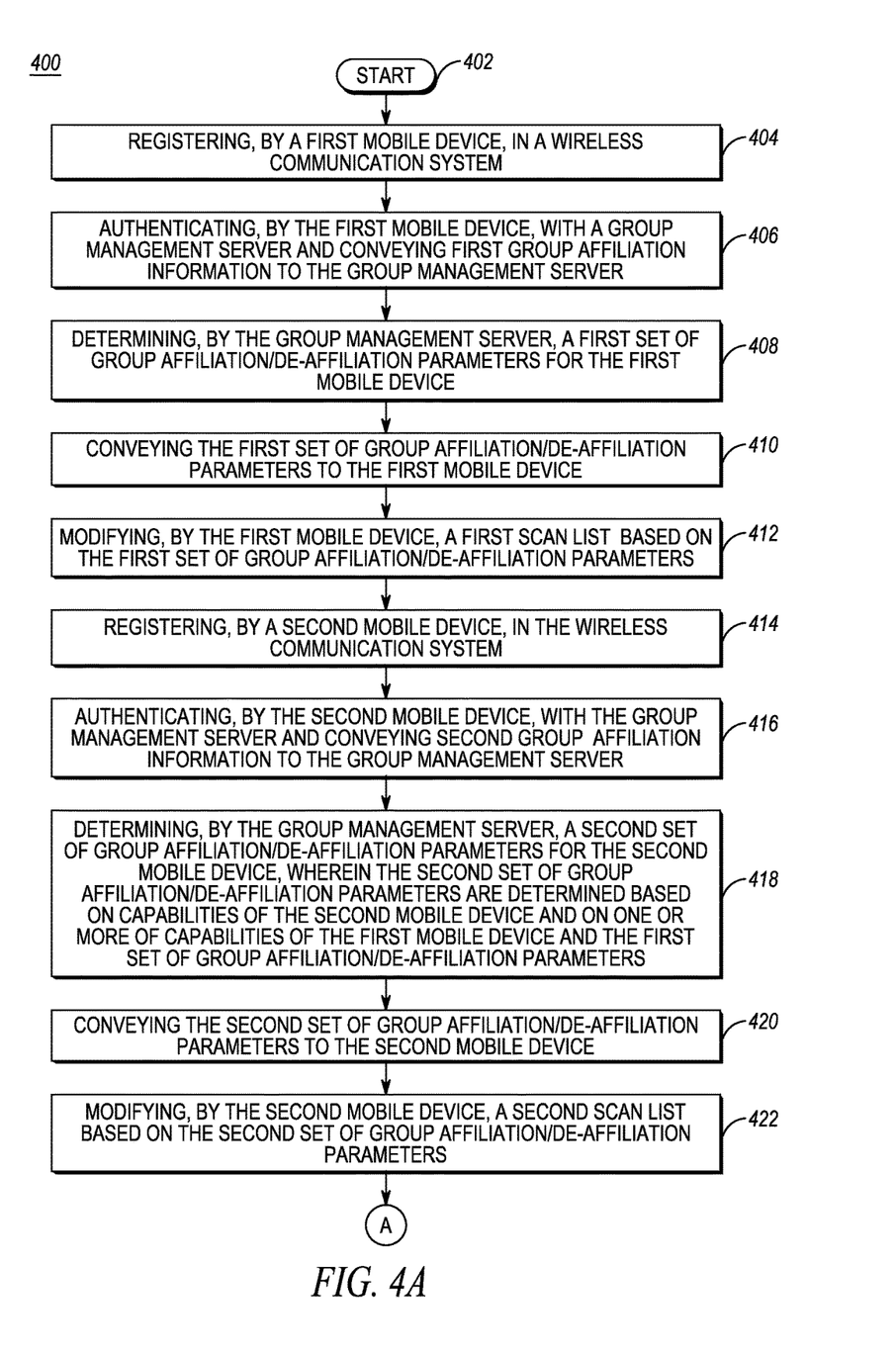
FIG. 4A is a logic flow diagram illustrating a method executed by the wireless communication system of FIG. 1 in controlling group affiliation in accordance with various embodiments of the present invention.
Figure 4B:
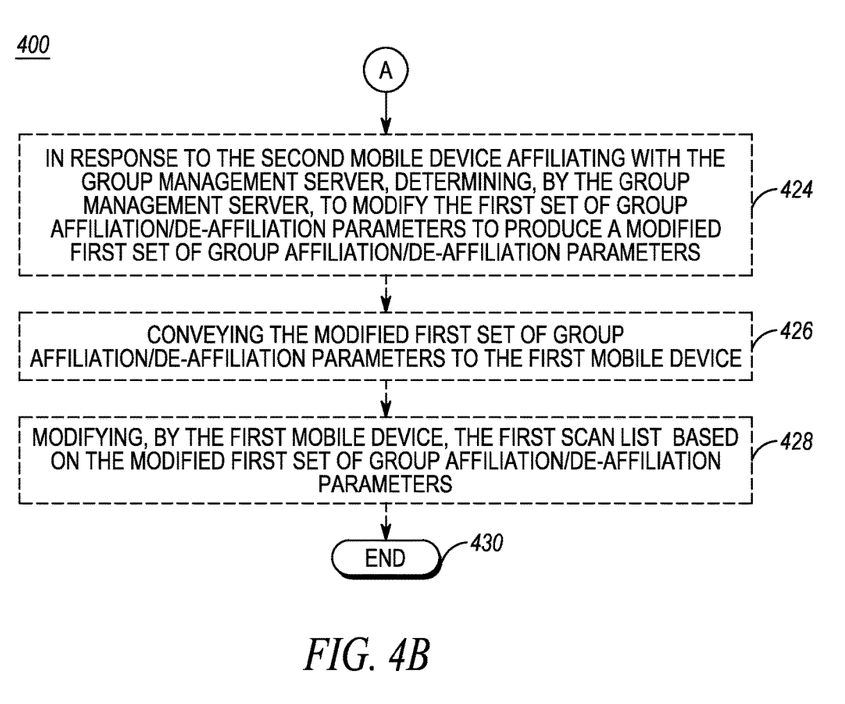
FIG. 4B is a continuation of the logic flow diagram of FIG. 4A illustrating a method executed by the wireless communication system of FIG. 1 in controlling group affiliation in accordance with various embodiments of the present invention.

Referring now to FIGS. 4A and 4B, a logic flow diagram 400 is provided that illustrates a method performed by communication system 100 in controlling group affiliation, and thereby group communication session participation, in accordance with various embodiments of the present invention. Logic flow diagram 400 begins (402) when a first mobile device, such as mobile device 104, of the multiple mobile devices 104, 106 of user 102 registers (404) with a network serving the mobile device, such as network 120 with respect to mobile device 104, and with service network 150 in accordance with well-known techniques. For example, mobile device 104 may activate in communication system 100 and, in response to activating in communication system 100, register with network 120 and service network 150.

As part of the process of registering with service network 150, first mobile device 104 authenticates (406) with Group Management Server 152 and affiliates with Group Management Server 152, that is, conveys a first group affiliation request and associated first group affiliation information to the Group Management Server, and in particular to group call contact and management functionality 154. The first group affiliation information includes an identifier of the mobile device, such as an SUID, an IMEI, an MSISDN, and/or an IMSI, an identifier of a user of the mobile device, that is, user 102, such as a name of the user and/or a badge number of the user, and information concerning any groups with which the mobile device/user is associated, such as a group identifier (ID), for example, a talkgroup ID. For example, and merely for the purpose of illustrating the principles of the present invention, it is assumed herein that mobile device 104 is a member of each group of a first set of groups, which first set of groups includes a Group 'A' and a Group 'B,' and that mobile device 106 is a member of each group of a second set of groups, which second set of groups includes Group A and further includes a Group 'C.' That is, the first set of groups and the second set of groups overlap and may or may not be the same. In response to receiving the first affiliation information from first mobile device 104 (including identifiers of a user, such as user 102, of mobile device 104, and of the groups of which mobile device 104 is a member, that is, Groups A and B), Group Management Server 152, and in particular group call contact and management functionality 154, binds the mobile device identifier to the user identifier, associated with mobile identifier and user identifier with the group identifiers, and compiles the affiliation information into a table maintained by the at least one memory device 304 of the Group Management Server.

Further, in response to receiving the first group affiliation request and associated first group affiliation information from mobile device 104, Group Management Server 152, and in particular group call contact and management functionality 154, determines and stores (408), by reference to user profile database 164, a user profile associated with, and capabilities of, first mobile device 104 and further determines and stores values for a first set of one or more group affiliation parameters and group de-affiliation parameters in association with first mobile device 104. The first set of one or more group affiliation/de-affiliation parameters comprises a subset of one or more group affiliation/de-affiliation parameters for each of one or more groups to which the first mobile device 104 belongs, that is, for one or more groups of the first set of groups. For example, the first set of one or more group affiliation/de-affiliation parameters may include a first subset of one or more group affiliation/de-affiliation parameters that are applicable to Group A and a second subset of one or more group affiliation/de-affiliation parameters that are applicable to Group B, or the first set of one or more group affiliation/de-affiliation parameters may include a single subset of one or more group affiliation/de-affiliation parameters that are applicable to both Group A and Group B, or the first set of one or more group affiliation/de-affiliation parameters may include a subset of group affiliation/de-affiliation parameters that are applicable to both Group A and Group B and subsets of group affiliation/de-affiliation parameters that are applicable to only Group A or to only Group B.

A first group affiliation/de-affiliation parameter of the set of one or more group affiliation/de-affiliation parameters is a 'group attachment lifetime' parameter that identifies a lifetime of a group attachment, that is, a time period upon whose expiration the mobile device's attachment to a given group will expire. The group attachment lifetime may be the same for all groups to which the mobile device affiliates, that is, Groups A and B with respect to mobile device 104, or may be individually set for each group. For example, a value for the group attachment lifetime parameter may be 'infinite,' or 'open ended,' wherein the mobile device/user will be affiliated with the group for the lifetime of the group. By way of another example, the group attachment lifetime parameter may have a 'limited duration' value, specifying a period of time during which the mobile device/user will remain attached with the group, for example, a number of minutes, hours, or days, during which the mobile device/user will remain attached to the group and after with the mobile device/user's attachment to the group will expire, or specifying a time at which the mobile device/user's attachment to the group will expire.

A second group affiliation/de-affiliation parameter of the subset of one or more group affiliation/de-affiliation parameters is a 'group affiliation frequency' parameter. The group affiliation frequency parameter indicates a frequency with which, that is, how often, the mobile device should affiliate to each of one or more groups of which it is a member, that is, Groups A and B with respect to mobile device 104. For example, a value for a group affiliation frequency parameter may be 'daily,' 'weekly,' 'weekdays,' or 'upon a next reset of the mobile device.'

A third group affiliation/de-affiliation parameter of the subset of one or more group affiliation/de-affiliation parameters is an 'auto-affiliation' parameter. The auto-affiliation parameter indicates whether the mobile device will be automatically affiliated to one or more of groups of which the mobile device is a member each time the mobile device registers with Group Management Server 152, that is, to one or more of Groups A and B with respect to mobile device 104. That is, the auto-affiliation parameter indicates, for a given group associated with user 102, such as Group A, whether Group Management Server 152 will automatically affiliate the mobile device with Group A whenever the mobile device registers with the Group Management Server. Correspondingly, each time the device 104 registers with the Group Management Server, the mobile device 104 automatically includes, in its scan list 105, each group identified by the 'auto-affiliation' parameter. For example, the 'auto-affiliation' parameter may indicate that mobile device 104 will be automatically affiliated with Group A, but not Group B, each time the mobile device registers with Group Management Server 152. As a result, when mobile device 104 affiliates with Group Management Server 152, the mobile device affiliates with Group A but does not affiliate with Group B.

A fourth group affiliation/de-affiliation parameter of the subset of one or more group affiliation/de-affiliation parameters is a 'de-affiliation' parameter. The de-affiliation parameter comprises a list of one or more groups of which the mobile device is a member and with respect to which the mobile device is to de-affiliate. That is, the de-affiliation parameter identifies one or more groups that are to be automatically removed from a scan list of the mobile device.

Therefore, when mobile device 104 receives a 'de-affiliation' parameter identifying one or more of the groups on the mobile device's scan list 105, such as one or more of Groups A and B, the mobile device automatically removes, from scan list 105, all such groups identified by the 'de-affiliation' parameter.

A fifth group affiliation/de-affiliation parameter of the subset of one or more group affiliation/de-affiliation parameters is a 'selected talkgroup' parameter. The selected talkgroup parameter identifies a group that is automatically set to the priority talk group of the mobile device, overriding the priority talkgroup currently selected by the user. Subsequent PTT communication will result in communication to the new selected talkgroup. At any given instant of time, only one group is chosen as the 'selected talkgroup.'

Group Management Server 152 then conveys (410), to mobile device 104, the first set of one or more group affiliation/de-affiliation parameters. For example, Group Management Server 152 may convey the first set of one or more group affiliation/de-affiliation parameters by use of vCard, as described by the Open Mobile Alliance Data Synchronization [OMA-DS], which provides a Converged Address Book (CAB) Enabler that provides a mechanism for managing list synchronization between a network-based server, such as Group Management Server 152, and a client of a mobile device, such as group call client 206 of mobile device 104. By way of another example, Group Management Server 152 may convey the one or more group affiliation/de-affiliation parameters by use of Session Initiation Protocol (SIP) messaging. By way of yet another example, Group Management Server 152 may convey the one of more group affiliation/de-affiliation parameters by use of Open Mobile Alliance XML Document Management enabler's XCAP protocol.

In response to receiving the first set of one or more group affiliation/de-affiliation parameters, first mobile device 104 modifies (412) a group entry for each group listed in a first scan list, that is, scan list 105, maintained by the first mobile device, such as Groups A and B, to reflect the subset of one or more group affiliation/de-affiliation parameters received with respect to that group. For example, based on the 'group attachment lifetime' parameter, mobile device 104 may indicate, in scan list 105, an identified lifetime of an attachment to that group; based on the 'group affiliation frequency' parameter, mobile device 104 may indicate, in scan list 105, how often the mobile device needs to affiliate to that group; based on the 'auto-affiliation' parameter, mobile device 104 automatically includes the group in scan list 105 each time the mobile device registers with Group Management Server 152; based on the 'de-affiliation' parameter, mobile device 104 automatically removes the group from scan list 105; and based on the 'selected talkgroup' parameter, mobile device 104 automatically changes the selected talk group or priority talk group of the device.

Concurrent with, or subsequent to, mobile device 104 affiliating with Group Management Server 152, a second mobile device, such as mobile device 106, of the multiple mobile devices 104, 106 of user 102 registers (414) with a network serving the mobile device, such as network 130 with respect to mobile device 106, and with service network 150. As part of the process of registering with service network 150, mobile device 104 authenticates (416) with Group Management Server 152 and affiliates with the Group Management Server, that is, conveys a second group affiliation request and associated second group affiliation information to Group Management Server 152, and in particular to group call contact and management functionality 154. As described above, such group affiliation information may include an identifier of the mobile device, such as an SUID, an IMEI, an MSISDN, and/or an IMSI, an identifier of a user of the mobile device, that is, user 102, such as a name of the user and/or a badge number of the user, and information concerning any groups with which the mobile device/user is associated, such as a group identifier (ID), for example, a talkgroup ID. In response to receiving the second group affiliation information from second mobile device 106 (including identifiers of a user of mobile device 106 and of the groups of which mobile device 106 is a member, that is, Groups A and C), Group Management Server 152, and in particular group call contact and management functionality 154, binds the mobile device identifier to the user identifier, associated with mobile identifier and user identifier with the group identifiers, and compiles the affiliation information into a table maintained by the at least one memory device 304 of the Group Management Server.

Further, in response to receiving the second affiliation information from second mobile device 106, Group Management Server 152 determines and stores (418), by reference to user profile database 164, a user profile associated with, and capabilities of, second mobile device 106 and further determines and stores values for a second set of one or more group affiliation parameters and group de-affiliation parameters for mobile device 106. Group Management Server 152 determines the second set of one or more group affiliation/de-affiliation parameters based on the profile and capabilities associated with second mobile device 106 and further based on one or more of capabilities of other mobile devices of the same user 102 that are also affiliated with Group Management Server 152, that is, in this instance, first mobile device 104, and the sets of one or more group affiliation/de-affiliation parameters determined for such other mobile devices, in this instance the first set of one or more group affiliation/de-affiliation parameters determined for first mobile device 104. Similar to the first set of one or more group affiliation/de-affiliation parameters, the second set of group affiliation/de-affiliation parameters comprises a subset of one or more group affiliation/de-affiliation parameters for one or more groups to which the second mobile device 106 belongs, that is, the second set of groups comprising Groups A and C, such as a 'group attachment lifetime' parameter, a 'group affiliation frequency' parameter, an 'auto-affiliation' parameter, a 'de-affiliation' parameter, and a 'selected talkgroup' parameter.

For example, for a given group that is included in both the first set of groups (associated with mobile device 104) and the second set of groups (associated with mobile device 106), such as Group A, Group Management Server 152 may determine to set a value of one or more group affiliation/de-affiliation parameters applicable to Group A in the second set of one or more group affiliation/de-affiliation parameters to the same value as was set for that group affiliation/de-affiliation parameter, with respect to Group A, in the first set of one or more group affiliation/de-affiliation parameters. By way of another example, Group Management Server 152 may determine to set a value of one or more group affiliation/de-affiliation parameters applicable to Group A in the second set of one or more group affiliation/de-affiliation parameters to a different value as was set for that group affiliation/de-affiliation parameter, with respect to Group A, in the first set of one or more group affiliation/de-affiliation parameters.

For example, if a group attachment lifetime parameter for mobile device 104 has a lengthy value, for example, a week or weeks, then a value of the group attachment lifetime parameter for mobile device 106 may be much shorter, that is, an affiliation of mobile device 106 with Group A may be considered more discretionary for the user in that the user is already affiliated with Group A via mobile device 104. Similarly, if a group affiliation frequency parameter for mobile device 104 has a lengthy value, for example, wherein the mobile device need re-affiliate only every week, then a group affiliation frequency parameter for mobile device 106 may be of a much higher frequency, for example, daily, as, again, an affiliation of mobile device 106 with Group A may be considered more discretionary for the user in that the user is already affiliated with Group A via mobile device 104 for a lengthier period of time. By way of still another example, Group Management Server 152 may determine, based on the capabilities and services supported by each of mobile devices 104 and 106, that one of mobile device 104 and 106 is better matched to a communication session involving Group A and, correspondingly, set a value for the de-affiliation parameter for the other mobile device, of mobile device 104 and 106, that instructs the other mobile device to de-affiliate from Group A. For example, one of mobile device 104 and 106 may support multicast services (such as MBMS or eMBMS or SC-PTM) and the other mobile device may not, wherein multicast service is the preferred scheme for a current or anticipated communication session involving that group. In another example, one of mobile devices 104 and 106 may support a vocoder that is more commonly shared among the other members of Group A than the vocoders supported the other mobile device of mobile devices 104 and 106, which vocoder is a currently being used or is anticipated to be used in communication session involving that group. One may note that by utilizing a same vocoder at different mobile devices that are members of a same group, the infrastructure of communication system 100 may have to perform less interworking of communications among the mobile devices. In yet another example, mobile devices 104 and 106 may have different secure communication capabilities, where Group Management Server 152 may choose to de-affiliate mobile devices from a group that are not capable of secure communication using a certain level of security (e.g., hardware encryption or software encryption or clear calls).

Group Management Server 152 then conveys (420), to second mobile device 106, the second set of group affiliation/de-affiliation parameters. In response to receiving the second set of group affiliation/de-affiliation parameters, second mobile device 106 modifies (422) a group entry for each group listed in a second scan list, that is, scan list 107, maintained by the second mobile device to reflect the subset of one or more group affiliation/de-affiliation parameters received with respect to that group. Logic flow 400 then ends (430).

In some embodiments, in response to receiving affiliation information from second mobile device 106, Group Management Server 152 further may determine (424) to modify the first set of one or more group affiliation/de-affiliation parameters associated with the first mobile device to produce a modified first set of one or more group affiliation/de-affiliation parameters. Group Management Server 152 then may convey (426), to first mobile device 104, the modified first set of group affiliation/de-affiliation parameters. In response to receiving the modified first set of group affiliation/de-affiliation parameters, first mobile device 104 modifies (428) a group entry for each group listed in the first scan list, that is, scan list 105, maintained by the first mobile device to reflect the modified first set of group affiliation/de-affiliation parameters received with respect to that group, and logic flow 400 then ends (430).

For example, second mobile device 106 may be a preferred mobile device, as between mobile devices 104 and 106, for participating in group communications involving multicast services or a particular type of vocoding, where such multicast services or vocoding type is currently being used or is anticipated to be used in communication session involving a given group. In another example, mobile devices 104 and 106 may have different secure communication capabilities and by using second mobile device 106 (as opposed to first mobile device 104) for a group communication involving a given group, that group may be able to engage in a secure communication using a higher level of security. Accordingly, Group Management Server 152 may determine to modify a 'selected talkgroup' parameter or an 'auto-affiliation' parameter of first mobile device 104 in response to receiving the affiliation information from second mobile device 106. In yet other examples, Group Management Server 152 may determine to modify a group attachment lifetime parameter, a group affiliation frequency parameter, or a de-affiliation parameter of first mobile device 104 in response to receiving the affiliation information from second mobile device 106, for example and as noted above, lengthening of shortening the group attachment lifetime parameter or the group affiliation frequency parameter or reversing a de-affiliation parameter based on a group attachment lifetime parameter, a group affiliation frequency parameter, or a de-affiliation parameter determined for second mobile device 106.

Figure 5:
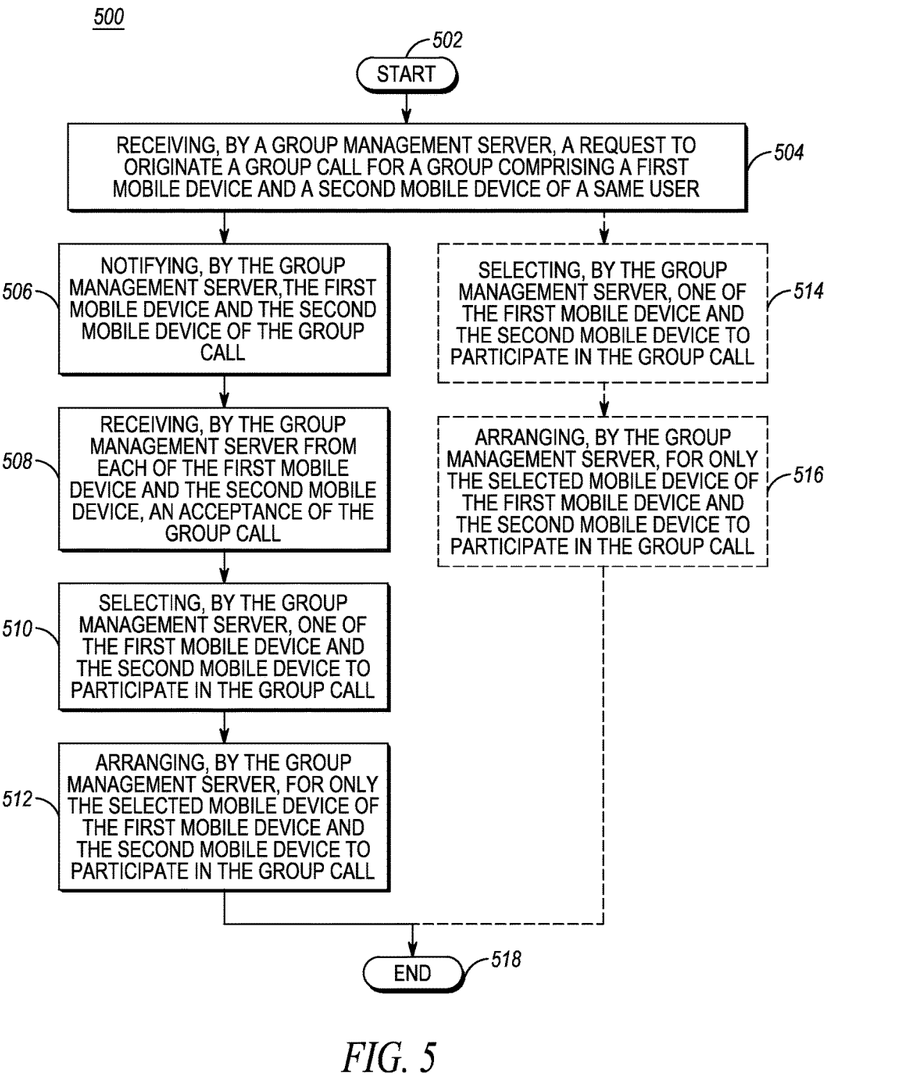
FIG. 5 is a logic flow diagram illustrating a method executed by the wireless communication system of FIG. 1 in controlling group affiliation in accordance with various embodiments of the present invention.

Referring now to FIG. 5, a logic flow diagram 500 is provided that that illustrates a method performed by communication system 100 in controlling group affiliation in accordance with various embodiments of the present invention. It is assumed herein, with respect to logic flow diagram 500, that each of the multiple mobile device 104, 106 of user 102 has activated in communication system 100 and is registered with Group Management Server 152.

Logic flow diagram 500 begins (502) when Group Management Server 152 receives (504) a request to originate a group call for a group that includes a plurality of the mobile devices of user 102, that is, both first mobile device 104 and second mobile device 106. For example, the group call request may include a group ID that is included in the scan lists 105, 107 of both mobile device 104 and mobile device 106, or the group call request may include a list of mobile devices identifiers that includes the identifiers of both mobile device 104 and mobile device 106.

In one embodiment of the present invention, in response to receiving the group call request at step 504, Group Management Server 152 may notify (506) each of mobile devices 104 and 106 of the group call. For example, Group Management Server 152 may convey a group call session invitation to each of mobile devices 104 and 106 via networks 120 and 130, respectively, or the Group Management Server may broadcast a notification of the group call via networks 120 and 130. In response to being notified of the group call, each of mobile devices 104 and 106 notifies (508) Group Management Server 152 of the mobile device's acceptance of the group call.

In response to receiving an acceptance of the group call from each of mobile device 104 and 106 at step 508, Group Management Server 152 selects (510) a mobile device of the plurality of the mobile devices of user 102 to participate in the group call, that is, selects one or mobile devices 104 and 106 to produce a selected mobile device, and arranges (512) for only the selected mobile device to participate in the group call. For example, if Group Management Server 152 selects mobile device 104 to participate in the group call, the Group Management Server may terminate the participation of non-selected mobile device 106 by conveying a session ended, session termination, or session disconnect message to non-selected mobile device 106, such as a Session Initiation Protocol (SIP) BYE message or a Transmission Control Protocol/Internet Protocol (TCP/IP) disconnect message. By way of another example, the Group Management Server may terminate the participation of non-selected mobile device 106 by conveying a 'de-affiliation' parameter to mobile device 106 that instructs mobile device 106 to de-affiliate from the group and remove the group from its scan list. Logic flow 500 then ends (518).

In selecting a mobile device of the multiple mobile devices of user 102 to participate in the group call, Group Management Server 152 may consider factors such as device capabilities, transceiving performance characteristics, and system efficiency. For example, by reference to user profile database 164, Group Management Server 152 may determine that a mobile device of the multiple mobile devices 104 and 106 is data-enabled and another mobile device is a voice-only mobile device, and may select the data-enabled or voice-only mobile device as is appropriate for the group call. For example, if the group call will involve a video transmission, Group Management Server 152 may select the data-enabled mobile device, whereas if the group call is merely a voice call, the Group Management Server may select the voice-only mobile device. By way of another example, Group Management Server 152 may select a mobile device that supports a vocoder that will be used for the group call and/or that is most widely supported by the other mobile devices that will be participating in the group call. By way of yet another example, if MBMS services are available for the group call, Group Management Server 152 may select an MBMS-enabled mobile device to avoid having to set up, and consume extra bandwidth for, a unicast downlink transmission to a non-MBMS enabled mobile device. By way of still another example, Group Management Server 152 may select a mobile device served by a network, such as network 120 or network 130, with the greatest available bandwidth, that provides the lowest cost of service, or that provides the highest level of security, for example, selecting a mobile device operating on a private network of a public safety agency as opposed to a mobile device, such as a BYOD (Bring your Own Device), operating over the network of a commercial carrier. By way of yet another example, Group Management Server 152 may select a mobile device having a best transceiving performance characteristic. For example, each access network 122, 124 serving one or more of the multiple mobile devices of a user may provide, to the Group Management Server, transceiving performance characteristics such as a signal strength (such as received signal strength indication (RSSI)) or a signal quality (such as signal-to-noise ratio (SNR), a signal-to-noise plus interference ratio (SNR), a carrier-to-interference-plus-noise ratio (CINR), a bit energy-to-noise density ratio (Eb/Io), a bit error rate, or a frame error rate) associated with a signal conveyed to, or received from, each of one or more of the multiple mobile devices of the user. The Group Management Server then may select a mobile device having a best transceiving performance characteristic.

In another embodiment of the present invention, in response to receiving the group call request at step 504, Group Management Server 152 Group Management Server 152 may select (514) a mobile device of the plurality of the mobile devices of user 102, that is, select one of mobile device 104 and 106, to participate in the group call prior to inviting each of the multiple mobile devices 104, 106 to participate in the group call. Again, in selecting a mobile device of the multiple mobile devices of user 102 to participate in the group call, Group Management Server 152 may consider factors such as device capabilities, transceiving performance characteristics, and system efficiency. Group Management Server 152 then arranges (516) for only the selected mobile device, for example, mobile device 104, to participate in the group call. For example, Group Management Server 152 may notify only the selected mobile device, that is, mobile device 104, of the group call, so that only the selected mobile device participates in the group call. Logic flow 500 then ends (518).

The embodiments of the present invention preferably are implemented within each of mobile devices 104 and 106 and Group Management Server 152, and more particularly with or in software programs and instructions stored in the at least one memory devices 204, 304 and executed by the processors 202, 302 of the mobile devices and Group Management Server. However, one of ordinary skill in the art realizes that the embodiments of the present invention alternatively may be implemented in hardware, for example, integrated circuits (ICs), application specific integrated circuits (ASICs), and the like, such as ASICs implemented in one or more of mobile devices 104 and 106 and Group Management Server 152 and all references to 'means for' herein may refer to any such implementation of the present invention. Based on the present disclosure, one skilled in the art will be readily capable of producing and implementing such software and/or hardware without undo experimentation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for controlling group affiliation in a wireless communication system, the method comprising:
   receiving, by a group management server from a second mobile device associated with a user, an affiliation request;
   determining, by the group management server, values for a second set of one or more group affiliation parameters and group de-affiliation parameters for the second mobile device, wherein the second set of one or more group affiliation parameters and group de-affiliation parameters concern affiliation by the second mobile device with a set of groups and wherein the determination of the second set of one or more group affiliation parameters and group de-affiliation parameters is based on one or more of:
      a capability of a first mobile device associated with the user; and
      one or more values of a first set of one or more group affiliation parameters and group de-affiliation parameters associated with the first mobile device; and
   in response to receiving the affiliation request, conveying, to the second mobile device, the second set of one or more group affiliation parameters and group de-affiliation parameters.

2. The method of claim 1, wherein the second set of one or more group affiliation parameters and group de-affiliation parameters comprises one or more of:
   a group attachment lifetime parameter that identifies a lifetime of a group attachment of the second mobile device to one or more groups of the set of groups;
   a group affiliation frequency parameter that indicates a frequency with which the second mobile device should affiliate to one or more groups of the set of groups;
   an auto-affiliation parameter that indicates whether the second mobile device will be automatically affiliated to one or more of groups of the set of groups;
   a de-affiliation parameter that identifies one or more groups of the set of groups from which the second mobile device is to de-affiliate; and
   a selected talkgroup parameter that identifies a group that will be set as the current talk group by the second mobile device.

3. The method of claim 1, wherein the method further comprises:
   receiving, by the second mobile device, the second set of one or more group affiliation parameters and group de-affiliation parameters; and
   modifying, by the second mobile device, a scan list maintained by the second mobile device based on the second set of one or more group affiliation parameters and group de-affiliation parameters.

4. The method of claim 3, wherein modifying the scan list comprises deleting a group from the scan list.

5. The method of claim 4, wherein a scan list of the first mobile device comprises the group deleted from the scan list of the second mobile device.

6. The method of claim 1, wherein the set of groups is a second set of groups, wherein the affiliation request is a second affiliation request, and wherein the method further comprises:
   receiving, by the group management server from the first mobile device, a first affiliation request;
   determining, by the group management server, the first set of one or more group affiliation parameters and group de-affiliation parameters, wherein the first set of one or more group affiliation parameters and group de-affiliation parameters are associated with a first set of groups and wherein the first set of groups and the second set of groups have at least one group in common; and in response to receiving the first affiliation request, conveying, to the first mobile device, the first set of one or more group affiliation parameters and group de-affiliation parameters.

7. A method for controlling group affiliation in a wireless communication system, the method comprising:

receiving, by a Group Management Server, a request to initiate a group call involving a group comprising a first mobile device and a second mobile device of a same user;

selecting, by the Group Management Server, only one of the first mobile device and the second mobile device to participate in the group call; and arranging, by the Group Management Server, for only the selected mobile device of the first mobile device and the second mobile device to participate in the group call.

8. The method of claim 7, wherein arranging for only the selected mobile device to participate in the group call comprises:

notifying only the selected mobile device, of the first mobile device and the second mobile device, of the group call.

9. The method of claim 7, further comprising:

notifying the first mobile device and the second mobile device of the group call; and wherein arranging for only the selected mobile device to participate in the group call comprises terminating a participation of a non-selected mobile device of the first mobile device and the second mobile device.

10. An apparatus for implementing a group call in a wireless communication system, the apparatus comprising:

a Group Management Server comprising:

a processor; and an at least one memory device that is configured to store a set of instructions that, when executed by the processor, cause the processor to perform the following functions:

receive, from a second mobile device associated with a user, an affiliation request;

determine for a second set of one or more group affiliation parameters and group de-affiliation parameters for the second mobile device, wherein the second set of one or more group affiliation parameters and group de-affiliation parameters concern affiliation by the second mobile device with a set of groups and wherein the determination of the second set of one or more group affiliation parameters and group de-affiliation parameters is based on one or more of:

a capability of a first mobile device associated with the user; and one or more values of a first set of one or more group affiliation parameters and group de-affiliation parameters associated with the first mobile device; and in response to receiving the affiliation request, convey, to the second mobile device, the second set of one or more group affiliation parameters and group de-affiliation parameters.

11. The apparatus of claim 10, wherein the second set of one or more group affiliation parameters and group de-affiliation parameters comprises one or more of:

a group attachment lifetime parameter that identifies a lifetime of a group attachment of the second mobile device to one or more groups of the set of groups;

a group affiliation frequency parameter that indicates a frequency with which the second mobile device should affiliate to one or more groups of the set of groups;

an auto-affiliation parameter that indicates whether the second mobile device will be automatically affiliated to one or more of groups of the set of groups;

a de-affiliation parameter that identifies one or more groups of the set of groups from which the second mobile device is to de-affiliate; and a selected talkgroup parameter that identifies a group that will be set as the current talk group by the second mobile device.

12. The apparatus of claim 10, wherein the apparatus further comprises the second mobile device and wherein the second mobile device is configured to:

receive the second set of one or more group affiliation parameters and group de-affiliation parameters; and modify a scan list maintained by the second mobile device based on the second set of one or more group affiliation parameters and group de-affiliation parameters.

13. The apparatus of claim 12, wherein the second mobile device is configured to modify the scan list by deleting a group from the scan list.

14. The apparatus of claim 13, wherein the apparatus further comprises the first mobile device and wherein the first mobile device is configured to maintain a scan list that comprises the group deleted from the scan list of the second mobile device.

15. The apparatus of claim 10, wherein the set of groups is a second set of groups, wherein the affiliation request is a second affiliation request, and wherein the at least one memory device is configured to store a set of instructions that, when executed by the processor, cause the processor to perform the following functions:

receive a first affiliation request;

determine the first set of one or more group affiliation parameters and group de-affiliation parameters, wherein the first set of one or more group affiliation parameters and group de-affiliation parameters are associated with a first set of groups and wherein the first set of groups and the second set of groups have at least one group in common; and in response to receiving the first affiliation request, convey, to the first mobile device, the first set of one or more group affiliation parameters and group de-affiliation parameters.

16. An apparatus for implementing a group call in a wireless communication system, the apparatus comprising:

a Group Management Server comprising:

a processor; and an at least one memory device that is configured to store a set of instructions that, when executed by the processor, cause the processor to perform the following functions:

receive a request to initiate a group call involving a group comprising a first mobile device and a second mobile device of a same user;

select only one of the first mobile device and the second mobile device to participate in the group call; and arrange for only the selected mobile device of the first mobile device and the second mobile device to participate in the group call.

17. The apparatus of claim 16, wherein the at least one memory device is configured to store a set of instructions that, when executed by the processor, cause the processor to arrange for only the selected mobile device to participate in the group call by:

notifying only the selected mobile device, of the first mobile device and the second mobile device, of the group call.

18. The apparatus of claim 16, wherein the at least one memory device is configured to store a set of instructions that, when executed by the processor, cause the processor to notify the first mobile device and the second mobile device of the group call and wherein the at least one memory device further is configured to store a set of instructions that, when executed by the processor, cause the processor to arrange for only the selected mobile device to participate in the group call by terminating a participation of a non-selected mobile device of the first mobile device and the second mobile device.

19. A method for controlling group affiliation in a wireless communication system, the method comprising:

receiving, by a group management server from a first mobile device associated with a first user, a first affiliation request;

in response to receiving the first affiliation request, conveying, to the first mobile device, a first set of one or more group affiliation parameters and group de-affiliation parameters;

receiving, by a group management server from a second mobile device associated with the first user, a second affiliation request;

in response to receiving the second affiliation request, modifying the first set of one or more group affiliation parameters and group de-affiliation parameters to produce a modified first set of one or more group affiliation parameters and group de-affiliation parameters; and conveying, to the first mobile device, the modified first set of one or more group affiliation parameters and group de-affiliation parameters.

* * * * *